United States Patent [19]
Scott

[11] Patent Number: 5,944,863
[45] Date of Patent: Aug. 31, 1999

[54] APPARATUS FOR CONTROLLING FLOW OF CASING GLASS IN A CASED GLASS STREAM

[75] Inventor: Garrett L. Scott, Toledo, Ohio

[73] Assignee: Owens-Brockway Glass Container Inc., Toledo, Ohio

[21] Appl. No.: 08/837,036

[22] Filed: Apr. 11, 1997

[51] Int. Cl.⁶ ........................................................ C03B 7/00
[52] U.S. Cl. .......................... 65/145; 65/29.17; 65/29.1; 65/129; 65/158; 65/164; 65/180; 65/324; 65/325
[58] Field of Search ................................ 65/29.17, 29.1, 65/121, 123, 126, 129, 145, 158, 164, 180, 324, 325, 328, 330, DIG. 13

[56] References Cited

U.S. PATENT DOCUMENTS

| | | |
|---|---|---|
| 1,828,217 | 10/1931 | Barker, Jr. . |
| 1,961,893 | 6/1934 | Wadman et al. . |
| 2,306,789 | 12/1942 | McNamara . |
| 2,371,213 | 3/1945 | Batchell . |
| 2,565,136 | 8/1951 | Kretzmer, Jr. . |
| 2,730,560 | 1/1956 | Hage . |
| 2,950,571 | 8/1960 | Wythe . |
| 3,573,019 | 3/1971 | Rees . |
| 4,011,070 | 3/1977 | Hynd . |
| 4,023,950 | 5/1977 | Glaser . |
| 4,305,747 | 12/1981 | Kirkman et al. . |
| 4,312,657 | 1/1982 | Canfield et al. . |
| 4,375,669 | 3/1983 | Johnson et al. . |
| 4,478,628 | 10/1984 | Dunn . |
| 4,514,209 | 4/1985 | Mumford . |
| 4,554,000 | 11/1985 | Suomala et al. . |
| 4,682,998 | 7/1987 | Ayala-Ortiz . |
| 4,708,729 | 11/1987 | Cardenas-Franco et al. . |
| 4,740,401 | 4/1988 | Barkhau et al. . |
| 4,762,544 | 8/1988 | Davey . |
| 5,562,751 | 10/1996 | Peterson et al. . |

FOREIGN PATENT DOCUMENTS

| | | |
|---|---|---|
| 0050765 | 10/1981 | European Pat. Off. . |
| 0522731 | 1/1993 | European Pat. Off. . |
| 0 722 908 A2 | 7/1996 | European Pat. Off. . |
| 0722907 | 7/1996 | European Pat. Off. . |

Primary Examiner—Steven P. Griffin

[57] ABSTRACT

Apparatus for forming a cased glass stream having an inner core glass surrounded by an outer casing glass includes a first orifice for receiving core glass from a first source. A second orifice is vertically spaced beneath and aligned with the first orifice, and is surrounded by a chamber that communicates with the second orifice through a gap between the first and second orifices. A spout delivers casing glass from a second source through a tube to the chamber in such a way that glass flows by gravity from the first and second sources through the orifices to form the cased glass stream. Rate of glass flow through the second or casing glass source is measured and compared with one or more preset limits. Rate of casing glass flow from the second source to the chamber surrounding the orifices is adjusted when rate of flow through the second source departs from the preset limit. In this way, a desired ratio of casing glass to core glass is automatically maintained.

8 Claims, 1 Drawing Sheet

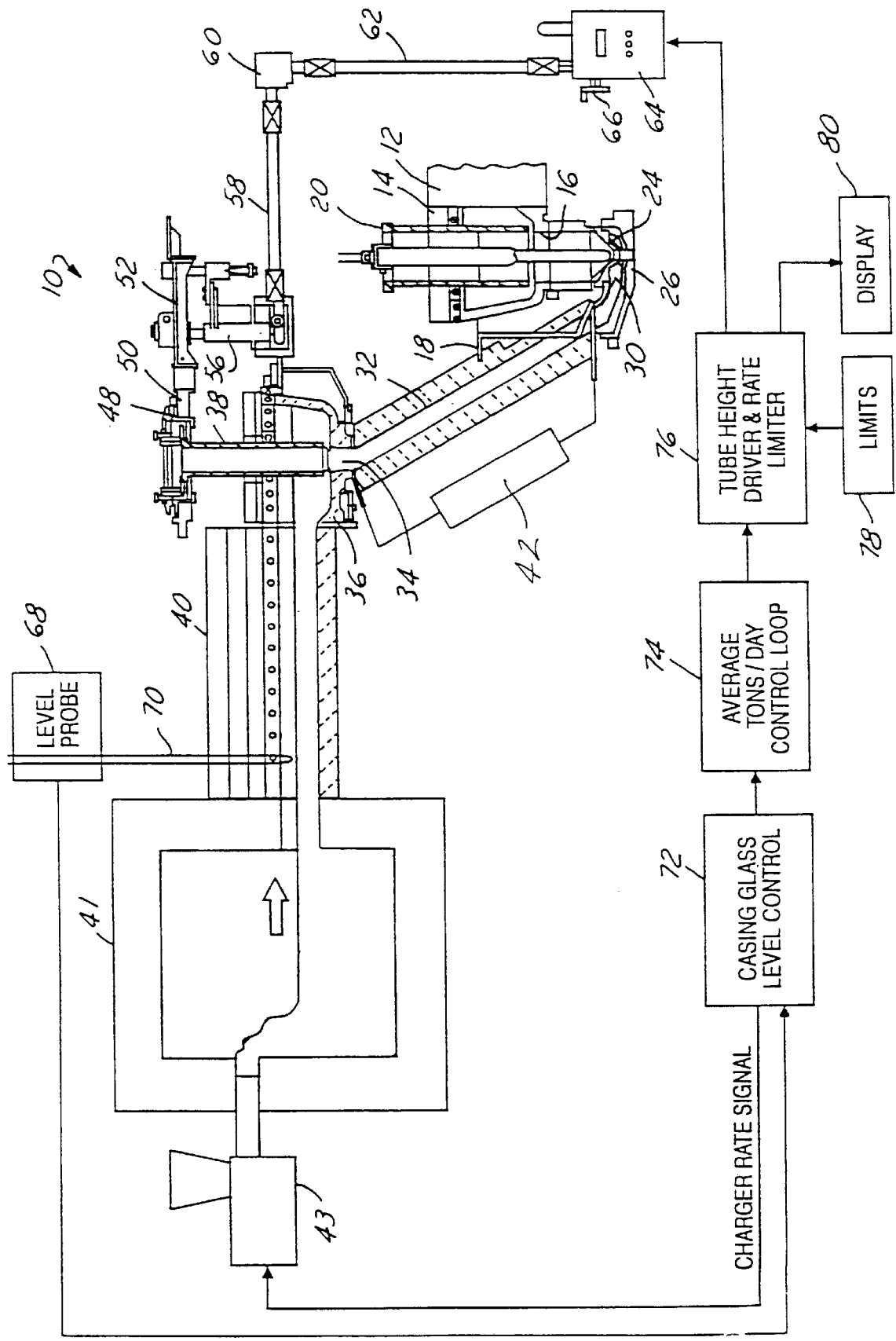

APPARATUS FOR CONTROLLING FLOW OF CASING GLASS IN A CASED GLASS STREAM

The present invention is directed to delivery of a glass stream for forming glass charges or gobs for glassware manufacture, and more particularly to a method and apparatus for delivering a so-called cased glass stream in which an inner or core glass is surrounded by an outer or casing glass layer.

BACKGROUND AND SUMMARY OF THE INVENTION

It has heretofore been proposed to provide a cased glass stream for forming glassware having layered wall segments. U.S. application Ser. Nos. 08/374,371, now abandoned, and 08/374,372, now abandoned, disclose techniques for delivering such a cased glass stream in which core glass from a first source is delivered through a first orifice. A second orifice is vertically spaced beneath and aligned with the first orifice, and is surrounded by an annular chamber that communicates with the second orifice through the gap between the first and second orifices. A heated tube delivers casing glass from a second glass source to the annular chamber that surrounds the second orifice. Glass flows by force of gravity from the first and second sources through the first and second orifices in such a way that a cased glass stream emerges from the second orifice. This cased glass stream may be sheared by conventional techniques to form individual cased glass gobs for delivery to conventional individual section glassware forming machines.

Although the techniques disclosed in the noted patent applications address and overcome problems theretofore extant in the art, further improvements remain desirable. For example, an important factor in proper manufacture of cased glassware is maintaining a desired ratio between the casing glass and the core glass. Because of higher operating temperatures in the casing glass system, refractory erosion is high in the casing glass spout, which in turn requires that glass flow through the casing glass spout be adjusted frequently to offset erosion enlargement of the flow path. The rate of casing glass flow is also affected by changes in ambient temperature that affect drafts around the forehearth and spout, changes in the spout cover opening around the spout flow control tube, changes in the manually adjusted gas-fired heating at the spout, and jostling or disturbance at the positioning mechanism for the flow control tube. Casing glass spout flow adjustments are currently made by manually adjusting position of a flow control tube within the casing glass spout. It is a general object of the present invention to provide a method and apparatus for automatically controlling the rate of glass flow through the casing glass spout so as to maintain the desired ratio between casing and core glasses in the cased glass stream. Another and more specific object of the present invention is to provide a method and apparatus of the described character for adjusting casing glass flow in which adjustments are automatically implemented at periodic intervals for accommodating inherent delays and transient conditions in glass flow dynamics.

Apparatus for forming a cased glass stream having an inner core glass surrounded by an outer casing glass includes at least one first orifice for receiving core glass from a first source. At least one second orifice is vertically spaced beneath and aligned with the first orifice, and is surrounded by a chamber that communicates with the second orifice through a gap between the first and second orifices. A spout delivers casing glass from a second source through a tube to the chamber in such a way that glass flows by gravity from the first and second sources through the orifices to form the cased glass stream. In accordance with one aspect of the present invention, the rate of glass flow through the second or casing glass source is measured and compared with one or more preset thresholds or limits. Rate of casing glass flow from the second source to the chamber surrounding the orifices is adjusted when rate of flow through the second source departs from the desired flow rate. For example, when flow rate exceeds a desired upper limit or threshold, flow rate is automatically reduced. On the other hand, if flow rate drops below a desired lower threshold or limit, flow rate is automatically increased. In this way, the desired ratio of casing glass to core glass is automatically maintained.

In the preferred embodiment of the present invention, casing glass is delivered through a spout having a lower spout opening, and a flow control tube disposed within the spout for movement toward and away from the spout opening so as selectively to close and open the opening. The spout tube is coupled to an electric motor that is driven by electronic circuitry automatically responsive to rate of glass flow into the casing glass spout for selectively operating the motor and restricting flow through the spout opening. Movement at the casing glass flow control tube preferably is enabled only at periodic intervals so as to accommodate inherent delays associated with changes of glass flow through the system. Glass flow rate preferably is periodically measured and averaged over the measurement interval so as to accommodate transient conditions. Most preferably, the flow control tube is moved toward or away from the spout opening a predetermined distance after each measurement interval within which average glass flow rate exceeds or is below the desired flow threshold limit. This is accomplished in the preferred embodiment of the invention by use of a stepper motor, and providing to the stepper motor a predetermined number of pulses corresponding to the predetermined desired incremental travel distance at the spout tube.

In accordance with another aspect of the present invention, a method of delivering a glass stream includes the step of delivering glass from a glass batch hopper through a furnace to a spout having an opening through which the glass stream flows by force of gravity. The rate of flow of glass from the glass batch hopper through the furnace is measured, and the rate of flow from the spout opening is controlled so as to maintain the rate of flow from the glass batch hopper through the furnace within preset limits. The rate of glass flow through the spout opening is controlled by positioning a tube within the spout for movement toward and away from the opening, and controlling position of the tube with respect to the spout opening. The latter is most preferably accomplished by coupling the tube to an electric motor, and activating the motor to move the tube toward and away from the spout opening so as to maintain the rate of glass flow through the furnace within preset limits. The preferred implementation of this aspect of the invention is in a method of forming a cased glass stream wherein the rate of casing glass flow from the casing glass batch hopper through the casing glass furnace is measured, and rate of glass flow through a casing glass spout is automatically controlled so as to maintain such flow above a preset limit.

BRIEF DESCRIPTION OF THE DRAWINGS

The invention, together with additional objects, features and advantages thereof, will be best understood from the following description, the appended claims and the accompanying drawing, which is a fragmentary elevational schematic diagram of a glass delivery system in accordance with a presently preferred embodiment of the invention.

DETAILED DESCRIPTION OF PREFERRED EMBODIMENTS

The drawing illustrates a system 10 for delivering a stream of cased glass. A first forehearth 12 delivers core glass to a spout 14 that has an opening 16 at the lower end thereof. Spout 14 is surrounded by a protective case 18, preferably constructed of non-magnetic metal such as stainless steel. A tube 20 controls delivery of core glass from spout 14 through opening 16 to and through one or more first orifices carried by an upper orifice ring 24 beneath spout 14. A lower orifice ring 26 carries one or more second orifices positioned beneath the orifice(s) of ring 24 and axially aligned therewith. The second orifice is surrounded by an annular chamber 30 formed between orifice rings 24, 26. Chamber 30 communicates with the second orifice by means of a lateral space or gap between the orifices. Annular chamber 30 is coupled by a delivery tube 32 to the opening 34 at the lower end of a casing glass spout 36. Spout 36 includes a delivery control tube 38, and is coupled to the casing glass forehearth 40 of a casing glass furnace 41. Casing glass furnace 41 receives casing glass from a glass batch hopper 43. Delivery tube 32 is resistance-heated by control electronics 42 for maintaining flow of casing glass to chamber 30. To the extent thus far described, system 10 in FIG. 1 is essentially the same as disclosed in above-noted U.S. application Ser. Nos. 08/374,371, now abandoned, and 08/374,372, now abandoned. The former of such applications is directed in particular to construction of casing glass delivery tube 32, while the latter of such applications is directed in particular to construction of orifice rings 24, 26. The disclosures of such applications, both of which are assigned to the assignee hereof, are incorporated herein by reference for purposes of background. U.S. Pat. No. 4,740,401, also assigned to the assignee hereof, discloses a cased glass stream delivery system in which a glass batch hopper delivers casing glass to associated casing glass furnace and forehearth.

Casing glass spout delivery control tube 38 has an upper lip or flange carried on a shoulder that surrounds an opening in an annular tube holder 48. Tube holder 48 is mounted on a support frame 50, which is coupled to a moveable support bracket 52. A beveled gear is mounted on holder 48 for rotating the holder and tube 38 about the central axis of the tube. The tube flange is held against the shoulder of holder 48 by means of angularly spaced hold-down clamps mounted on the gear. This mechanism for mounting tube 38 is the same as that shown in U.S. Pat. No. 4,514,209, assigned to the assignee hereof, to which reference may be made for a more detailed description.

Support bracket 52 is coupled by a planetary or worm gear 56 to a shaft 58. Shaft 58 is connected by a coupling 60 and a shaft 62 to a tube height actuator 64. Actuator 64 preferably comprises an electric stepper motor responsive to input pulses for rotating shaft 62 through a predetermined angle or step for each input pulse. Actuator 64 is also coupled to a wheel 66 for manual rotation of shaft 62. A glass level probe 68 is coupled to the control screen 70 at forehearth 40 to provide an electrical output signal indicative of casing glass level in forehearth 40, and therefore input flow rate through furnace 41 from hopper 43. This signal is fed to a casing glass level control 72, which drives batch hopper 43 to provide a desired glass flow rate. Level control 72 also provides to a control loop 74 an output indicative of casing glass flow rate. Control loop 74 obtains an average reading of flow rate (typically in tons/day) and feeds this signal to a controller 76. The function of controller 76 is to drive tube height actuator 64, while limiting the rate or frequency at which adjustments are made. Controller 76 receives upper and lower limits 78 bracketing a desired glass flow rate, and may also drive a display screen 80 for displaying operating and control parameters to an operator, such as measured casing glass flow rate, position of tube 38 with respect to spout opening 34, and flow limits set by operator input 78.

In operation, tube 38 is first adjusted, either manually by means of wheel 66 or electronically by means of actuator 64, to a desired initial spacing of the lower end of tube 38 from spout outlet opening 34. Glass is then fed from hopper 43 through furnace 41 to spout 36, and from spout 36 through tube 32 to orifice rings 24, 26 for formation of a cased glass stream. After flow conditions stabilize, control electronics 74 automatically begins taking input flow measurement readings from sensor 68. Control electronics 74 averages a plurality of flow measurement readings over periodic intervals to eliminate effects of transient flow variations. These average flow readings are compared to the desired maximum flow rate set at 78. As the casing glass flow stream erodes, casing glass flow rate begins to increase. When this flow rate reaches the upper limit set at 78, control electronics 76 automatically transmits a set number of pulses to the stepper motor of actuator 64 so as to lower tube 38 a predetermined distance. For example, if gear set 56 is such that one turn of shaft 58 is equal to a 0.028 inch drop of tube 38, corresponding to a gear ratio of 35 turns/inch, an input shaft velocity of 2.5 rpm for two seconds will obtain a 0.002 inch downward motion of tube 38 toward spout opening 34. This position is then held for another interval, preferably on the order of about thirty minutes, to provide sufficient delay for the changes in glass flow dynamics to work through the glass delivery system. A number of flow measurement readings are again then taken and averaged, and tube 38 is again moved a prespecified distance (0.002 inches in two seconds in this example) toward spout opening 34 if measured flow rate still exceeds desired flow rate. This process is repeated until the flow rate of glass from glass batch hopper 43 through furnace 41 is within the desired flow limits, after which flow rate is continually monitored until further adjustments are needed. If the measured flow rate undershoots the desired lower flow limit, tube 38 can be lifted one increment and the process repeated. Each reduction in casing glass flow will reduce the quantity of casing glass within a cased gob. Overall gob weight is maintained by control of core glass flow rate employing conventional gob weight control techniques.

It also may occur that measured flow rate decreases below the desired lower limit set at 78, for example due to a substantial decrease in ambient temperature. If this occurs, a process that is the reverse of that described above takes place, with the control tube being lifted one increment, average flow readings taken after an interval, and further movement implemented if necessary. There should be a sufficient gap between the upper and lower limits set at 78 (around the desired nominal flow rate) that the control tube is not shuttled excessively.

I claim:

1. Apparatus for forming a cased glass stream having an inner core glass surrounded by an outer casing glass, said apparatus including means for delivering core glass from a first source through a first orifice, means forming a second orifice vertically spaced beneath and aligned with said first orifice with a chamber surrounding said second orifice and communicating with said second orifice through a gap between said first and second orifices, and means for delivering casing glass from a second source to said chamber such that glass flows by gravity through said orifices to form said cased glass stream, wherein the improvement comprises said means for delivering casing glass includes:

means for measuring rate of flow of glass into said second source, means for comparing said rate of flow to a desired flow rate, and means for automatically adjusting rate of casing glass flow from said second source to said chamber when said rate of flow into said second source departs from said desired flow rate.

2. The apparatus set forth in claim 1 wherein said means for delivering casing glass comprises a spout for receiving casing glass and having a lower opening, and a flow control tube disposed within said spout for movement toward said opening to restrict flow through said opening, and wherein said means for automatically adjusting rate of casing glass flow comprises means for moving said tube with respect to said opening when said rate of flow into said second source departs from said desired flow rate.

3. The apparatus set forth in claim 2 wherein said means for moving said tube comprises an electric motor, means operatively coupling said electric motor to said tube, and means responsive to said comparing means for operating said motor.

4. The apparatus set forth in claim 3 wherein said comparing means comprises means for comparing said rate of flow to said desired flow rate at first periodic intervals, and wherein said means responsive to said comparing means comprises means for operating said motor and moving said tube a predetermined distance toward and away from said opening when said rate of glass flow departs from said desired flow rate after each said first periodic interval.

5. The apparatus set forth in claim 4 wherein said comparing means comprises means for averaging said rate of flow of glass into said second source and means for comparing average rate of glass flow into said second source to said desired flow rate.

6. The apparatus set forth in claim 5 wherein said electric motor comprises a stepper motor, and wherein said means responsive to said comparing means comprises means for transmitting a predetermined number of pulses to said stepper motor corresponding to travel of said predetermined distance at said tube.

7. The apparatus set forth in claim 2 further comprising means for setting a first limit above said desired flow rate and a second limit below said desired flow rate, wherein said comparing means comprises means for comparing measured rate of flow to said first and second limits, and wherein said means for automatically adjusting rate of glass flow comprises means for moving said tube toward said opening when measured rate of flow exceeds said first limit above said desired flow rate and means for moving said tube away from said opening when measured flow rate is less than said second limit below said desired flow rate.

8. The apparatus set forth in claim 3 wherein said second source includes a glass batch hopper, a furnace and a glass forehearth, and wherein said means for measuring measures rate of glass flow from said glass batch hopper through said furnace into said forehearth.

* * * * *